(12) United States Patent
Henson

(10) Patent No.: US 7,048,819 B1
(45) Date of Patent: May 23, 2006

(54) HOT AIR LAMINATION CHAMBER FOR MEDICAL CATHETERS

(76) Inventor: Dale L. Henson, 2157 O'Toole Ave., Ste. G, San Jose, CA (US) 95131

( * ) Notice: Subject to any disclaimer, the term of this patent is extended or adjusted under 35 U.S.C. 154(b) by 0 days.

(21) Appl. No.: 11/076,245

(22) Filed: Mar. 8, 2005

(51) Int. Cl.
B32B 37/00 (2006.01)

(52) U.S. Cl. .................. 156/82; 156/381; 156/497; 156/499

(58) Field of Classification Search .............. 156/82, 156/381, 391, 497, 499, 538, 539
See application file for complete search history.

(56) References Cited

U.S. PATENT DOCUMENTS

| 4,526,642 | A | * | 7/1985 | Caughey | ............... | 156/311 |
| 5,569,402 | A | * | 10/1996 | Meisser et al. | ............... | 219/400 |
| 5,993,591 | A | * | 11/1999 | Buendia et al. | ............... | 156/275.5 |

* cited by examiner

Primary Examiner—James Sells
(74) Attorney, Agent, or Firm—The Kline Law Firm

(57) ABSTRACT

A system of heat shrink lamination that uses one or more lamination chambers with forced flow of heated air from a central heating area. The central heating area includes at least one heating element. A fan situated at one end of the central heating area provides high speed air circulation by forcing the heated air down through hot air plenums in the lamination chambers. At the lower end of the lamination chambers, the hot air is returned through air flow ducts to the central heating area.

4 Claims, 1 Drawing Sheet

HOT AIR LAMINATION CHAMBER FOR MEDICAL CATHETERS

BACKGROUND OF THE INVENTION

1. Field of the Invention

The present invention relates generally to devices that are used to apply heat to shrink wrap material, and more particularly is a hot air lamination chamber for medical catheters.

2. Description of the Prior Art

The manufacture of a medical catheter involves multiple processes and the utilization of sometimes very expensive materials. The basic procedure includes wrapping a central tubular element with conductive and/or sensing wires, then covering the wires with a protective outer sleeve. Because of the nature of operations involving catheters, the outer sleeve must be a smooth, low friction surface. While some catheters can be manufactured using an extrusion process to provide the outer sleeve, many of the wire wrappings used on the catheters are too delicate for such operations. The outer sleeve in these cases is typically shrink tubing, and is applied using heat to shrink the sleeve onto the wires and central tube of the catheter in a lamination process.

The heat shrink lamination operation can occur at very high temperatures –650° F. or higher. The operating temperature must be held steady at the desired temperature or negative results occur. For example, a shrink tube that shrinks at 650° F. may well melt if the temperature reaches 670° F. Therefore the temperature of the environment in which the heat shrink or lamination operation is performed must be maintained at a steady state.

Current art processes utilize either a radiant electric heater or a total-loss compressed air heating system. Systems using a radiant electric heater have a very difficult time controlling the temperature of the product. While the calibration thermocouple used in the device can be held at the proper temperature, the temperature of the product being processed can undergo a temperature fluctuation of up to ±50° F. Such temperature fluctuations can easily ruin the lamination process, thereby requiring scrapping of the part. As indicated above, the part at that point has already had significant manufacturing process hours invested, and may embody some very expensive materials.

The other type of current art device, the total loss compressed air heating systems, have much better temperature control. However, the hot air used to laminate the product is exhausted to the room in which the process takes place. This can be very undesirable, as the processing is most often in an air conditioned clean room. In addition to the exhausted air, compressed air heating systems require pneumatic plumbing. Equipment with pneumatic plumbing is more difficult to maintain in conformance to US National Fire Protection Association standards (e.g. NFPA-79) and European CE standards. The pneumatic systems have to be separated from the rest of the electronics to prevent problems such as line moisture causing electrical shorts.

Accordingly, it is an object of the present invention to provide a lamination chamber that can maintain a very steady elevated temperature.

It is another object of the present invention to provide a method of constructing a catheter that increases the yield of a lamination process.

It is a still further object of the present invention to provide a process that does not exhaust a large amount of hot air into an air conditioned clean room environment.

It is yet another object of the present invention to provide a device that does not require pneumatic plumbing.

SUMMARY OF THE INVENTION

The present invention is a method of heat shrink lamination that uses one or more lamination chambers with forced air flow. In the preferred embodiment, the system uses a pair of lamination chambers with a heating area connected to a central controller. Multiple double chambers can be mounted to a single machine, thereby providing a system that has four or more lamination chambers that are centrally controlled.

The central heating area includes a means to heat air, which in the preferred embodiment is a resistance heating element. A fan situated at a top end of the central heating area provides high speed air circulation by forcing the heated air down through hot air plenums in the lamination chambers. At the lower end of the lamination chambers, the hot air is returned through air flow ducts to the central heating area. The Venturi effect of the air being forced past the catheter guide openings at the top of the lamination chambers cancels the buoyancy effect of the heated air. Similarly, the downward air flow at the lower end of the lamination chambers cancels the buoyancy effect there. The forced air flow pattern therefore results in there being almost no air flow out of the upper and lower catheter guide openings.

It should be noted that while the invention is described herein with reference to the manufacture of catheters, the system can be used for any process that exposes a product to air heated to a uniform temperature. Any heat shrink or drying operations can be performed in the device of the present invention.

An advantage of the present invention is that due to the high speed air flow in the device, the temperature in the lamination chambers can be maintained at a very steady state.

Another advantage of the present invention is that by recirculating the heated air, the system avoids dumping hot, dirty air into an air conditioned clean room environment.

A still further advantage of the present invention is that multiple lamination chambers are supplied with hot air from a single central heating area.

These and other objects and advantages of the present invention will become apparent to those skilled in the art in view of the description of the best presently known mode of carrying out the invention as described herein and as illustrated in the drawings.

DETAILED DESCRIPTION OF THE INVENTION

Figure 1:
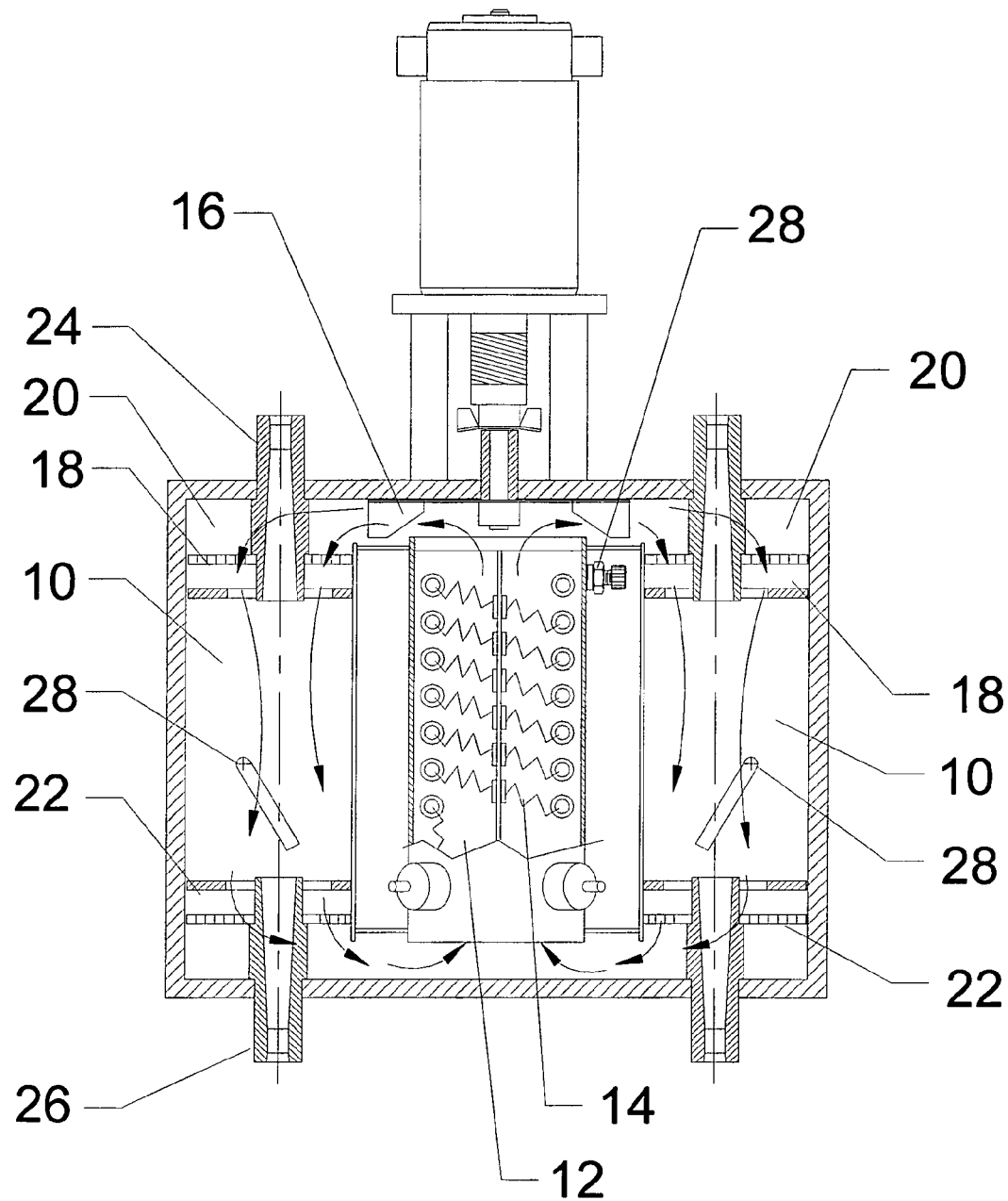
FIG. 1 is a sectional schematic view of the hot air lamination chamber of the present invention.

The present invention is a device that enables a method of heat shrink lamination using one or more lamination chambers 10 with forced air flow. While it is clear that a single lamination chamber 10 could be employed if desired, the preferred embodiment utilizes at least a pair of lamination chambers 10 connected to a central heating area 12. Using multiple lamination chambers 10 attached to a single central heating area 12 multiplies the efficiency of the device. Two pairs of chambers 10 can be mounted to the heating area 12, thereby providing a system that has four lamination chambers 10 that are supplied with hot air from a single central heating area 12.

The central heating area 12 includes a means to heat air 14. In the preferred embodiment, the means to heat air 14 comprises a plurality of resistance heating wire elements. The heating elements are readily available through commercial outlets.

A fan 16 is situated at a top end of the central heating area 12. The fan 16 provides the impetus for the high speed air circulation in the system by forcing heated air down through upper air flow ducts 18 into the hot air plenums 20 in the lamination chambers 10. (The air flow in the system is represented by the arrows in FIG. 1.) The hot air flows downward through the hot air plenums 18, where it contacts the catheters or other product being processed. At the lower end of the lamination chambers 10, the hot air flows out through the lower air flow ducts 22 and is returned to the central heating area 12.

Two air flow effects are present in the lamination chamber of the present invention. All heated air has a buoyancy effect that tends to make the heated air rise. A Venturi effect is created by the heated air being forced through the air flow ducts at high speed at the upper end of the chamber. The two effects tend to cancel each other. Similarly, the forced downward air flow tends to cancel the buoyancy effect at the lower end of the chambers. The end result is that in the system of the present invention, there is a negligible air loss through the inlet and outlet product guides 24, 26 at the top and bottom ends respectively of the lamination chambers. Very little heated air is lost to the environment, which is typically an air conditioned clean room. Moreover, the turbulent air flow created in the device is optimal for heat transfer.

The temperature in the system is monitored by a plurality of thermocouples 28. In the preferred embodiment, at least three thermocouples 28 are utilized. A first thermocouple 28 is used to monitor the temperature of the central heating area 12, and a thermocouple 28 is positioned in each lamination chamber 10. The thermocouples 28 are in communication with the central controller. The temperatures indicated by the thermocouples in the lamination chambers are averaged for better temperature control in the system. If the temperature of the thermocouple in the heating area exceeds the safe operating temperature of the heater, that thermocouple becomes the controlling thermocouple.

The system can be used on any product which requires heat application. In the embodiment designed for producing medical catheters, the catheter tubing is inserted into the inlet product guide 24 and passed through the lamination chambers 10. The product passes out of the outlet product guide 26, and the lamination process is completed. The inlet and outlet product guides 24, 26 can of course be modified to accommodate the specific product being processed.

The above disclosure is not intended as limiting. Those skilled in the art will recognize that numerous modifications and alterations may be made while retaining the teachings of the invention. Accordingly, the above disclosure should be construed as limited only by the restrictions of the appended claims.

I claim:

1. A hot air chamber device comprising:
   a heating area,
   at least one lamination chamber with a product inlet at a first end and a product outlet at a second end, said lamination chamber having a first air flow duct and a second air flow duct in communication with said heating area, and
   a fan; wherein
   air is heated in said heating area, heated air then being forced by said fan through said first air flow duct into a hot air plenum in said lamination chamber, said heated air passing through said hot air plenum and being drawn through said second air flow duct back into said heating area; such that a temperature of said lamination chamber is constant throughout, and negligible air flow occurs through said product inlet and said product outlet due to cancellation of a buoyancy effect of said heated air by an opposing Venturi effect of air moving at high speed through said first air flow duct.

2. The device of claim 1 wherein:
   said device comprises at least two lamination chambers.

3. A method of applying heated air to a product comprising the following steps:
   a) providing a heating area with a means to heat air,
   b) positioning a fan so that it forces air from said heating area into a lamination chamber at high speed, said lamination chamber including a product inlet and a product outlet, air flow from said product inlet and said product outlet being negligible due to a Venturi effect canceling a buoyancy effect of heated air, said lamination chamber further including air return means so that after heated air passes through a heated air plenum, said heated air is returned to said heating area, and
   c) processing said product by passing said product from said product inlet to said product outlet; wherein
   a temperature in said lamination chamber is constant throughout, and airflow in said lamination chamber is turbulent.

4. The method of claim 3 wherein:
   a plurality of lamination chambers are supplied with heated air from a single heating area.

* * * * *